(12) United States Patent
Yashiro

(10) Patent No.: US 11,577,760 B2
(45) Date of Patent: Feb. 14, 2023

(54) VEHICLE CONTROL APPARATUS, VEHICLE CONTROL METHOD, VEHICLE, AND STORAGE MEDIUM

(71) Applicant: HONDA MOTOR CO., LTD., Tokyo (JP)

(72) Inventor: Katsuya Yashiro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 479 days.

(21) Appl. No.: 16/801,629

(22) Filed: Feb. 26, 2020

(65) Prior Publication Data

US 2020/0283015 A1 Sep. 10, 2020

(30) Foreign Application Priority Data

Mar. 7, 2019 (JP) .............................. JP2019-041954

(51) Int. Cl.
*B60W 60/00* (2020.01)
*G05D 1/02* (2020.01)
*B60W 50/14* (2020.01)
*G05D 1/00* (2006.01)

(52) U.S. Cl.
CPC .......... *B60W 60/005* (2020.02); *B60W 50/14* (2013.01); *G05D 1/0088* (2013.01); *G05D 1/0231* (2013.01); *G05D 1/0257* (2013.01); *B60W 2050/146* (2013.01); *B60W 2420/42* (2013.01); *B60W 2420/52* (2013.01); *G05D 2201/0213* (2013.01)

(58) Field of Classification Search
CPC ............... B60W 60/005; B60W 50/14; B60W 2050/146; B60W 2420/42; B60W 2420/52; B60W 2554/402; B60W 50/082; B60W 2554/4041; G05D 1/0088; G05D 1/0231; G05D 1/0257; G05D 2201/0213
See application file for complete search history.

(56) References Cited

U.S. PATENT DOCUMENTS

| 7,689,359 B2 | 3/2010 | Tokoro et al. |
| 2007/0168128 A1 | 7/2007 | Tokoro et al. |
| 2018/0088571 A1* | 3/2018 | Weinstein-Raun ......................... G05D 1/0027 |
| 2019/0011927 A1* | 1/2019 | Mou ...................... G06V 20/56 |
| 2019/0012808 A1* | 1/2019 | Mou ...................... G01S 17/00 |

(Continued)

FOREIGN PATENT DOCUMENTS

JP 4193765 B2 12/2008

*Primary Examiner* — Donald J Wallace
(74) *Attorney, Agent, or Firm* — Thomas | Horstemeyer, LLP

(57) ABSTRACT

A vehicle control apparatus comprises a first detection unit configured to have a first detection range, a second detection unit configured to have a second detection range which at least partially overlaps the first detection range, and a vehicle control unit configured to be capable of performing vehicle control based on a first control state and vehicle control based on a second control state which has a high vehicle control automation rate or a reduced degree of vehicle operation participation requested to a driver compared to the first control state. The vehicle control unit performs control to shift from the first control state to the second control state based on a condition that a match degree between pieces of preceding object information of a vehicle detected by the first detection unit and the second detection unit.

15 Claims, 6 Drawing Sheets

(56) References Cited

U.S. PATENT DOCUMENTS

| | | | |
|---|---|---|---|
| 2020/0057441 A1* | 2/2020 | Wang | G05D 1/0088 |
| 2020/0086889 A1* | 3/2020 | Kaneko | G08G 1/096725 |
| 2020/0130704 A1* | 4/2020 | Viswanathan | B60W 60/0015 |
| 2020/0209853 A1* | 7/2020 | Leach | G01S 13/86 |
| 2020/0369274 A1* | 11/2020 | Mizuno | B60W 30/162 |

* cited by examiner

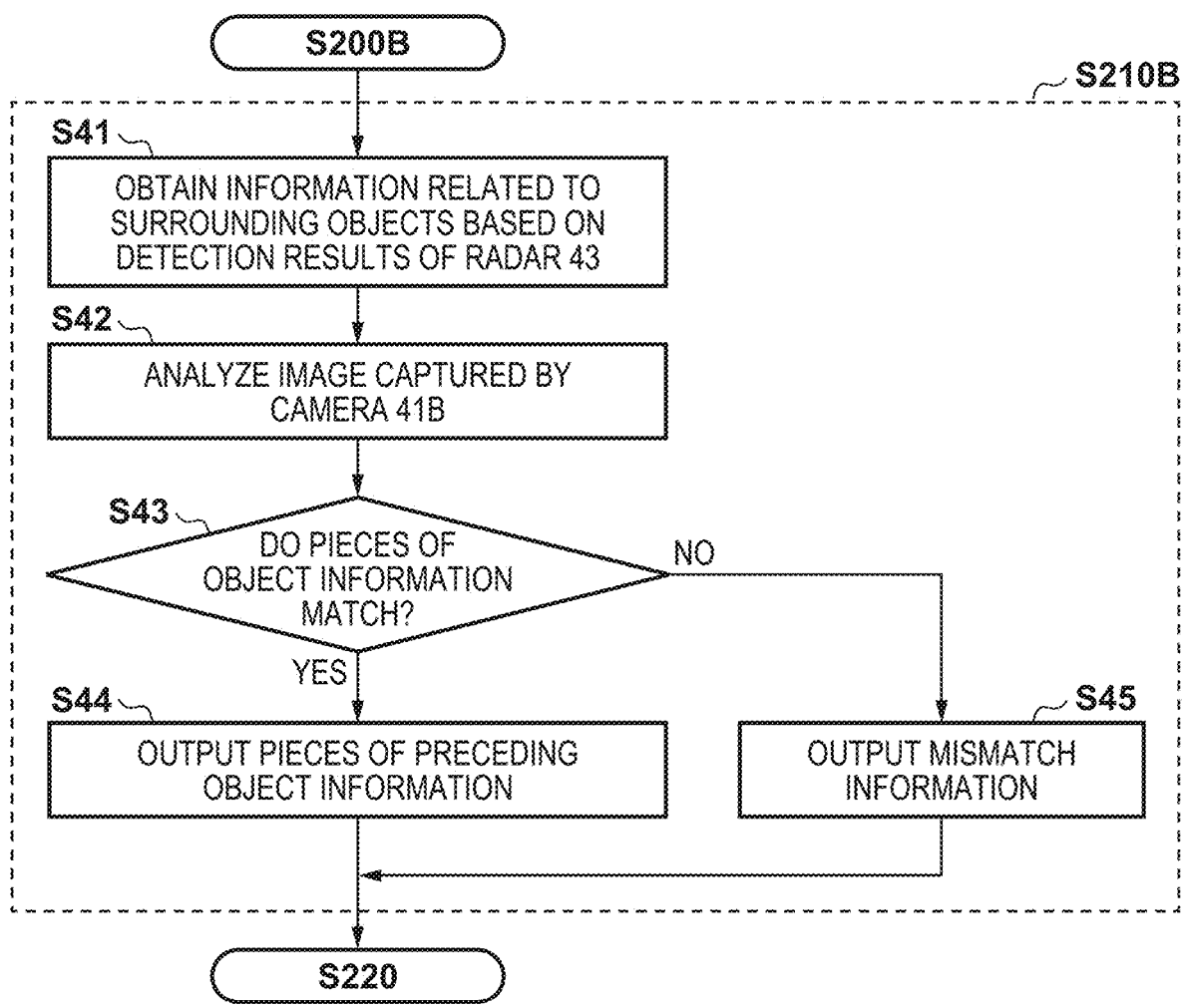

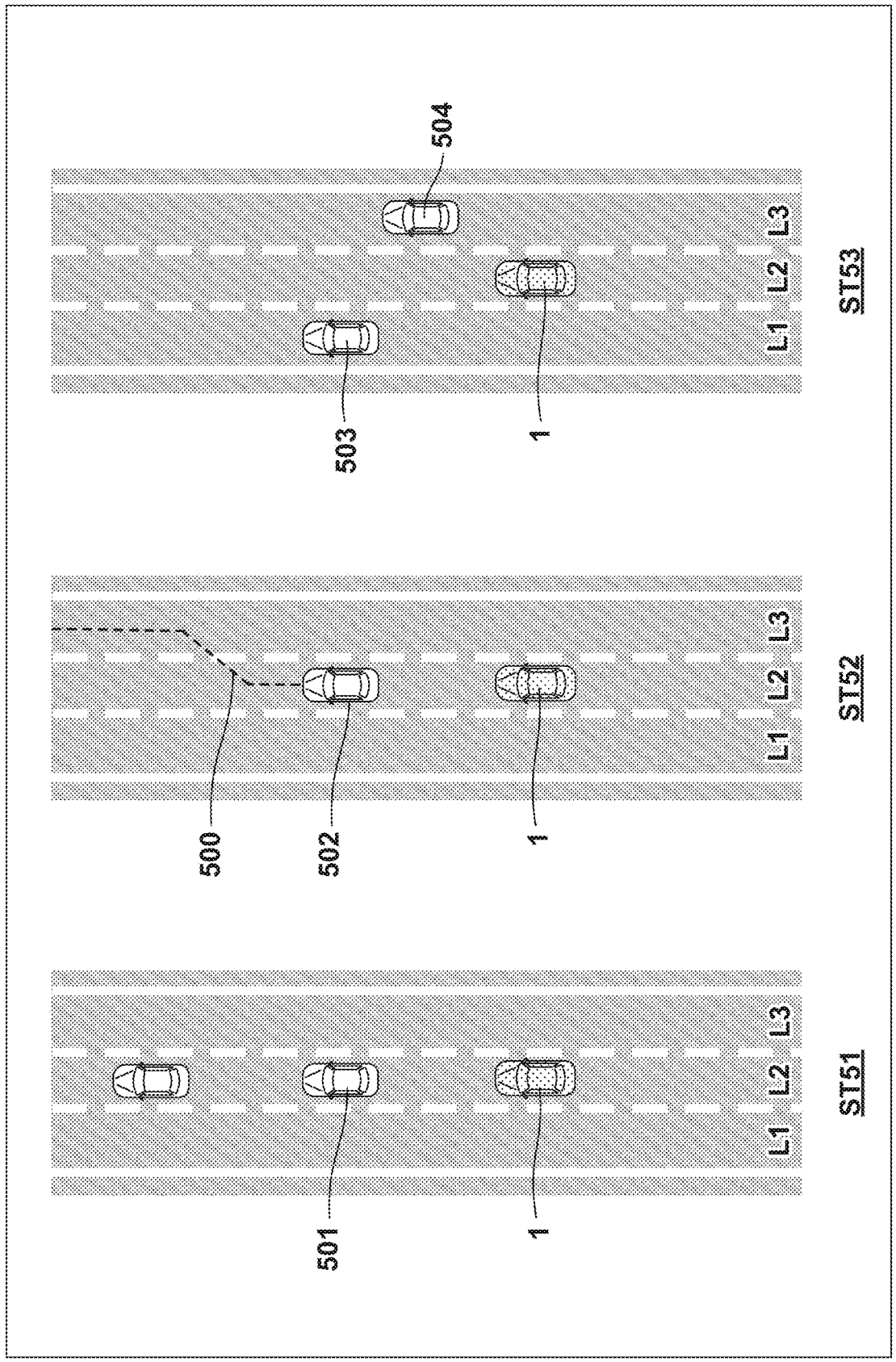

VEHICLE CONTROL APPARATUS, VEHICLE CONTROL METHOD, VEHICLE, AND STORAGE MEDIUM

CROSS-REFERENCE TO RELATED APPLICATION(S)

This application claims priority to and the benefit of Japanese Patent Application No. 2019-041954 filed on Mar. 7, 2019, the entire disclosure of which is incorporated herein by reference.

BACKGROUND OF THE INVENTION

Field of the Invention

The present invention relates to a vehicle control apparatus, a vehicle control method, a vehicle, and a storage medium, and more specifically to a vehicle control technique of an automated-driving vehicle.

Description of the Related Art

Japanese Patent No. 4193765 discloses an arrangement that uses a plurality of sensors to detect an object in the periphery of a vehicle and suppresses travel support control in the same control state when the number of effective detection devices decreases.

However, in a case in which the control state of the vehicle control is to shift to a more advanced control state, it is necessary to shift the control state by detecting information of the front of the vehicle and the like in a stable detection state.

The present invention is to solve the above-described problem which is related to at least the detection of information among the various kinds of conditions related to a control state shift, and provides a vehicle control technique that can shift the control state under a stable detection state.

SUMMARY OF THE INVENTION

According to one aspect of the present invention, there is provided a vehicle control apparatus that can control a vehicle based on a plurality of control states, comprising: a first detection unit configured to have a first detection range; a second detection unit configured to have a second detection range which at least partially overlaps the first detection range; and a vehicle control unit configured to be capable of performing, as vehicle control based on a plurality of control states, vehicle control based on a first control state and vehicle control based on a second control state which has a high vehicle control automation rate or a reduced degree of vehicle operation participation requested to a driver compared to the first control state, wherein the vehicle control unit performs control to shift from the first control state to the second control state based on a condition that a match degree between pieces of preceding object information of the vehicle detected by the first detection unit and the second detection unit is not less than a threshold.

According to another aspect of the present invention, there is provided a vehicle control method of a vehicle control apparatus that can control a vehicle based on a plurality of control states, including a first detection unit that has a first detection range, and a second detection unit that has a second detection range which at least partially overlaps the first detection range, the method comprising: performing, as vehicle control based on a plurality of control states, vehicle control based on a first control state and vehicle control based on a second control state which has a high vehicle control automation rate or a reduced degree of vehicle operation participation requested to a driver compared to the first control state, wherein in the performing, control is performed to shift from the first control state to the second control state based on a condition that a match degree between pieces of preceding object information of the vehicle detected by the first detection unit and the second detection unit is not less than a threshold.

According to the present invention, it is possible to provide a vehicle control technique that can shift a control state under a stable detection state. For example, in a case in which the control state is to shift from the current control state to a more advanced control state, that is, a control state with a high vehicle control automation rate or a reduced degree of vehicle operation participation requested to a driver compared to the current control state, it is possible to shift the control state in a stable detection state.

BRIEF DESCRIPTION OF THE DRAWINGS

FIG. 4 is a flowchart for explaining a more specific processing procedure of step S210B; and FIG. 5 is a view for schematically explaining travel states of the vehicle.

DESCRIPTION OF THE EMBODIMENTS

Figure 1A:
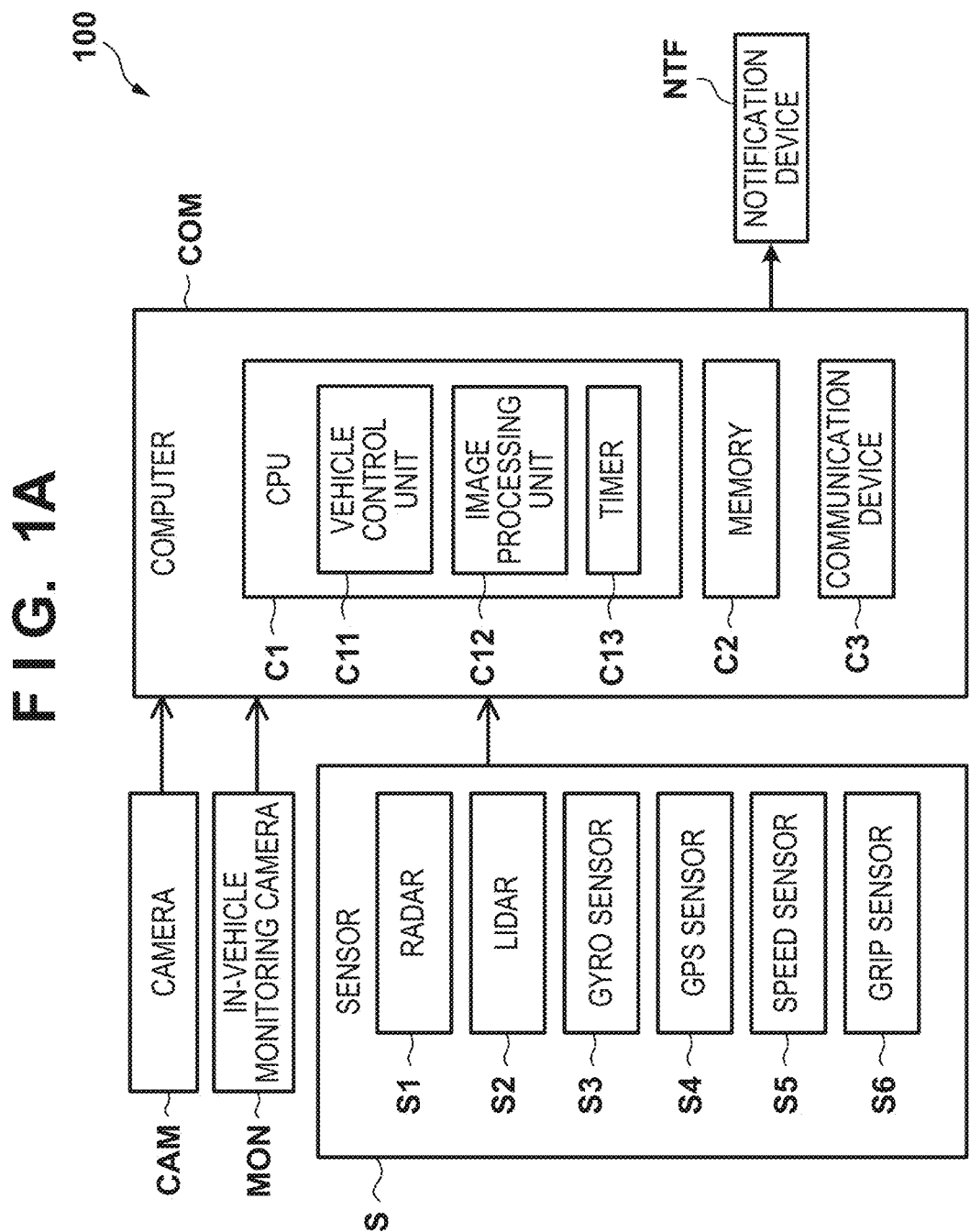
FIG. 1A is a block diagram showing an example of the arrangement of a vehicle control apparatus.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

[Arrangement of Vehicle Control Apparatus]

FIG. 1A is a block diagram showing an example of the arrangement of a travel control system that includes a vehicle control apparatus 100 for performing automated driving control of a vehicle. The vehicle control apparatus 100 includes sensors S, a plurality of cameras CAM, an in-vehicle monitoring camera MON, and a computer COM. The sensors S include, for example, a plurality of radars S1, a plurality of LiDARs (Light Detection and Ranging) S2, a gyro sensor S3, a GPS sensor S4, a speed sensor S5, a grip sensor S6, and the like.

The computer COM also includes a CPU C1 which is in charge of processing related automated driving control of the vehicle, a memory C2, and a communication device C3 which is capable of connecting to a network NET and communicating with a server device on the network, another vehicle positioned in the periphery of the vehicle (self-vehicle), and the like. The sensors S and the camera CAM will obtain various kinds of information of the vehicle and input the obtained information to the computer COM.

The CPU C1 of the computer COM performs image processing on image information input from the camera CAM. The CPU C1 extracts objects present in the periphery of the self-vehicle based on camera image information that has undergone image processing and sensor information input from the sensors S (the radars S1 and the LiDARs S2), analyzes what kind of objects are present in the periphery of the self-vehicle, and monitors the objects.

The gyro sensor S3 detects the rotary motion and the posture of the self-vehicle, and the computer COM can determine the track of the self-vehicle based on the detection result of the gyro sensor S3, the speed detected by the speed sensor S5, and the like. The GPS sensor S4 detects the current position (position information) of the self-vehicle in the map information.

The grip sensor S6 is, for example, incorporated in the steering wheel of the vehicle and can detect whether a vehicle occupant (driver) is gripping the steering wheel. The grip sensor S6 inputs the detected steering wheel grip information to the computer COM. The computer COM can determine, based on the steering wheel grip information input by the grip sensor S6, whether the vehicle occupant (driver) is gripping the steering wheel, that is, whether the steering wheel is currently in a "hands-on" state or a "hands-off" state.

The in-vehicle monitoring camera MON is arranged so as to be capable of capturing an image inside the vehicle, and captures an image of the vehicle occupant. The in-vehicle monitoring camera MON inputs, to the computer COM, the outer appearance information of the captured vehicle occupant. The computer COM can perform image processing on the image of the vehicle occupant input from the in-vehicle monitoring camera MON, and detect the outer appearance information of the vehicle occupant such as the expression, the facial direction, the line of sight, the degree of eye opening/closing, the driving posture, and the like of the vehicle occupant. The computer COM can determine, based on the detected outer appearance information of the vehicle occupant, whether the current driving state of the vehicle occupant (driver) is an "eyes-on" state or an "eyes-off" state.

A notification device NTF includes a voice output device and a display device. The voice output device notifies the driver of information by voice. The display device notifies the driver of information by displaying an image.

The computer COM of the vehicle control apparatus 100 can control the automated driving travel operation of the vehicle by causing the control state of the vehicle to shift in a plurality of control states based on the information of the peripheral environment of the vehicle. That is, the computer COM obtains peripheral environment information of the vehicle by using the information from the sensors S and the computer COM, shifts the control state of the vehicle based on the peripheral environment information, and controls the automated driving travel operation of the vehicle.

The CPU C1 of the computer COM functions as a vehicle control unit C11 and an image processing unit C12 by executing programs stored in the memory C2. The vehicle control unit C11 controls the vehicle based on the detection results of the detection units (the sensors S, the cameras CAM, and the like) that detect the information of the vehicle and the peripheral information of the vehicle. The automated driving travel operation of the vehicle is controlled by one of the plurality of control states.

In a case in which the vehicle is to incorporate the vehicle control apparatus 100 shown in FIG. 1A, the computer COM may be arranged in, for example, an ECU of recognition processing system that processes information of the sensors S, the cameras CAM, and the in-vehicle monitoring camera MON, an ECU of an image processing system, an ECU for controlling a communication device and an input/output device, an ECU in a control unit that executes vehicle driving control, or an ECU for automated driving. For example, as shown in FIG. 1B to be described below, the function of the computer COM may be distributed among a plurality of ECUs that form the vehicle control apparatus 100 such as the ECUs of the sensors S, the ECUs of the cameras, the ECU of the input/output device, the ECU for automated driving, and the like.

Figure 1B:
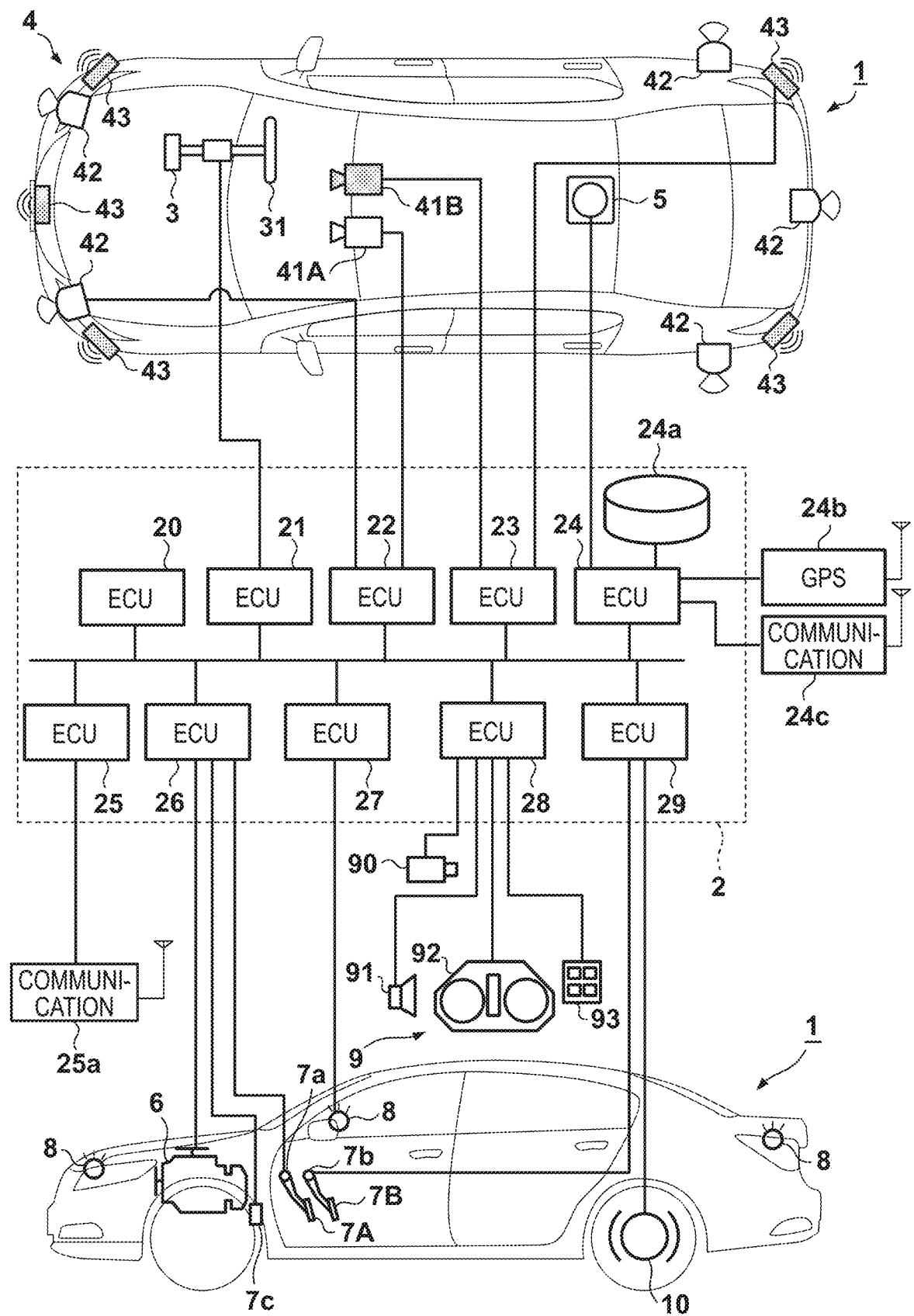
FIG. 1B is a view showing an example of the arrangement of a control block diagram for controlling a vehicle.

FIG. 1B is a view showing the arrangement example of a control block diagram of the vehicle control apparatus 100 for controlling the vehicle 1. The outline of vehicle 1 is shown by a plane view and a side view in FIG. 1B. The vehicle 1 is, for example, a sedan-type four-wheeled vehicle.

A control unit 2 shown in FIG. 1B controls each unit of the vehicle 1. The control unit 2 includes a plurality of ECUs 20 to 29 communicably connected by an in-vehicle network. Each ECU (Electronic Control Unit) includes a processor represented by a CPU (Central Processing Unit), a storage device such as a semiconductor memory, an interface with an external device, and the like. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can be appropriately designed in the vehicle 1, and they can be subdivided or integrated as compared to this embodiment.

The ECU 20 executes control associated with automated driving of the vehicle 1 (self-vehicle) according to this embodiment. In automated driving, at least one of steering and acceleration/deceleration of the vehicle 1 is automatically controlled. Processing associated with more specific control related to automated driving will be described in detail later.

The ECU 20 performs vehicle travel control based on based on the position of the vehicle 1 (self-vehicle) showing the peripheral state of the vehicle, the relative positions of other vehicles present in the periphery of the vehicle 1, the information of the road on which the vehicle 1 is traveling, the map information, and the like.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the direction of travel of the vehicle 1.

The ECUs 22 and 23 control detection units 41 to 43 that detect the peripheral state of the vehicle, and perform information processing of detection results. Detection units 41 are components corresponding to the cameras CAM of FIG. 1A and are image capturing devices (to be sometimes referred to as cameras 41A and 41B hereinafter, and components corresponding to the cameras 41A and 41B will also be referred to as a first image capturing unit and a second image capturing unit, respectively, hereinafter) that perform image capturing to detect an object in the periphery of the vehicle 1. The cameras 41A and 41B are attached to the windshield inside the vehicle cabin at the front of the roof of the vehicle 1. The ECUs 22 and 23 can analyze the images (image processing) captured by the cameras 41A and 41B to extract, for example, the contour of an object such as another vehicle traveling ahead in a lane on which the vehicle 1 is traveling or in an adjacent lane, a travel lane boundary (for example, a guardrails, lane markings, roadside plantings, and the like) of the road, and the like.

The detection unit 42 (LiDAR detection unit, to be also referred as a first object detection unit hereinafter) is, for example, Light Detection and Ranging (LiDAR) (to be sometimes referred to as the LiDAR 42 hereinafter), and uses light to detect a target around the vehicle 1 or measures the distance to a target. The detection units 42 (LiDARs 42) are components corresponding to the LiDARs S2 of FIG. 1A. In this embodiment, a plurality of LiDARs 42 are provided around the vehicle. In the example shown in FIG. 1B, five LiDARs 42 are provided; one at each corner of the front portion of the vehicle 1, one at the center of the rear portion, and one on each side of the rear portion.

The detection unit 43 (radar detection unit, to be also referred as a second object detection unit hereinafter) is, for example, a millimeter wave radar (to be sometimes referred to as the radar 43 hereinafter), and uses radio waves to detect a target around the vehicle 1 or measures the distance to a target. The detection units 43 (radars 43) are components that correspond to radars S1 of FIG. 1A. In this embodiment, a plurality of radars 43 are provided around the vehicle. In the example shown in FIG. 1B, five radars 43 are provided; one at the center of the front portion of the vehicle 1, one at each corner of the front portion, and one at each corner of the rear portion.

The ECU 22 controls one camera 41A and each LiDAR 42 and performs information processing of detection results. The ECU 23 controls the other camera 41B and each radar 43 and performs information processing of detection results. Since two sets of devices that detect the peripheral state of the vehicle are provided, the reliability of detection results can be improved. In addition, since detection units of different types such as cameras, LiDARs, and radars are provided, the peripheral environment of the vehicle can be analyzed multilaterally. Note that the ECU 22 and the ECU 23 may be integrated into a single ECU.

In this embodiment, a first detection device that has a first detection range of the periphery of the vehicle 1 is formed by the first object detection units (the LiDARs 42) for detecting an object in the periphery of the vehicle by light and the first image capturing unit (the camera 41A) for obtaining an image of the front of the vehicle. In addition, a second detection device that has a second detection range which at least partially overlaps the first detection range is formed by the second object detection units (the radars 43) for detecting an object in the periphery of the vehicle by radio waves and the second image capturing unit (the camera 41B) for obtaining an image of the front of the vehicle 1. In the first detection device and the second detection device, the first image capturing unit (the camera 41A) and the second image capturing unit (the camera 41B) are formed by the same type of cameras.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server device that provides map information and traffic information and obtains these pieces of information. The ECU 24 can access a map information database 24a formed in the storage device. The ECU 24 searches for a route from the current position to the destination. The database 24a can be arranged on a network, and the communication device 24c can obtain information by accessing the database 24a on the network. The gyro sensor 5, the GPS sensor 24b, the communication device 24c are components that correspond to the gyro sensor S3, the GPS sensor S4, and the communication device C3, respectively, of FIG. 1A.

The ECU 25 includes a communication device 25a for inter-vehicle communication. The communication device 25a performs wireless communication with another vehicle in the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the vehicle occupant (driver) detected by an operation detection sensor 7a provided on an accelerator pedal 7A, or switches the gear ratio of the transmission based on information such as a speed detected by a speed sensor 7c (the speed sensor S5 of FIG. 1A). If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8. In the example shown in FIG. 1B, the direction indicators 8 are provided in the front portion, door mirrors, and the rear portion of the vehicle 1.

The ECU 28 can control an input/output device 9 and perform image processing on the facial image of the driver input from an in-vehicle monitoring camera 90. The in-vehicle monitoring camera 90 in this case corresponds to the in-vehicle monitoring camera MON of FIG. 1A. The input/output device 9 outputs information to the vehicle occupant (driver) and accepts settings from the driver. A voice output device 91 notifies the driver of the information by voice. A display device 92 notifies the driver of information by displaying an image. The display device 92 is arranged, for example, in front of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification mode may be changed in accordance with the level (for example, the degree of urgency) of information of which the driver is to be notified. The voice output device 91 and the display device 92 correspond to, for example, the notification device NTF of FIG. 1A described above.

Although an input device 93 is a switch group that is arranged at a position where the driver can perform an operation and used to issue an instruction to the vehicle 1, it may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stop state of the vehicle 1. In addition, if the transmission of the power plant 6 includes a parking lock mechanism, it can be operated to maintain the stopped state of the vehicle 1.

[Plurality of Control States]

In this embodiment, vehicle control processes related to acceleration/deceleration, steering including the lane change operation, braking, and the like of the vehicle and tasks to be requested to the vehicle occupant (driver) are set in each of a plurality of control states. Tasks to be requested to the vehicle occupant include operation requested to the vehicle occupant to be in correspondence with a vehicle periphery monitoring request, for example, gripping of the steering wheel ("hands-off" or "hands-on"), periphery monitoring ("eyes-off" or "eyes-on"), driving takeover, and the like.

The plurality of control states are classified into a plurality of levels in accordance with the degree of automation (automation rate) of vehicle control and the degree of tasks requested (the degree of the vehicle occupant's participation in the operation of the vehicle) to the vehicle occupant (driver).

The vehicle control apparatus 100 can control the vehicle based on a plurality of control states. The vehicle control unit C11 controls the automated driving travel operation of the vehicle by one of the plurality of control states based on the information (external information) of the peripheral environment of the vehicle obtained from the first detection device (the first object detection units (the LiDARs 42) and the first image capturing unit (the camera 41A)), the second detection device (the second object detection units (the radars 43) and the second image capturing unit (the camera 41B)), and the like.

(First Control State)

In this embodiment, a first control state is a control state in which a predetermined degree of automation (automation rate) of vehicle control and a predetermined degree of tasks requested (the degree of the vehicle occupant's participation in the operation of the vehicle) to the vehicle occupant (driver) have been set. In the first control state, the main body that drives the vehicle is the driver, and the driver needs to monitor the periphery, but need not grip the steering wheel. The first control state is, for example, a control state that can be executed on the main lane of an expressway which is not congested.

(Second Control State)

A second control state is a control state that has a higher vehicle control automation rate (degree of automation) or a lower degree of vehicle operation participation requested to the driver than the first control state. In the second control state, the main body that drives the vehicle is the vehicle control apparatus 100 (vehicle system), and the driver neither needs to monitor the periphery nor grip the steering wheel. However, the driver is required to perform the vehicle system monitoring duty in preparation for a warning notification from the vehicle system. The second control state is a control state in which vehicle control can be performed in a travel lane (for example, a lane L2 shown in ST51 of FIG. 5) of the vehicle 1 within a predetermined speed range for operating vehicle control, and is a control state that can be executed in, for example, a travel scene (TJP: Traffic Jam Pilot) in which the vehicle 1 (self-vehicle) follows a preceding vehicle 501 (ST51 of FIG. 5) traveling ahead of the self-vehicle in the main lane of a congested expressway.

The vehicle control unit C11 can perform, as vehicle control based on a plurality of control states, vehicle control based on the first control state and vehicle control based on the second control state which has a high vehicle control automation rate or a reduced degree of vehicle operation participation requested to the driver compared to the first control state.

Note that the control state is not limited to the example described above, and vehicle control can be performed based, for example, a control state (to be referred to as a "third control state" hereinafter) which has a low vehicle control automation rate (degree of automation) or a high degree of vehicle operation participation requested to the driver compared to the first control state.

[Vehicle Control Procedure of Vehicle Control Apparatus]

Figure 2:
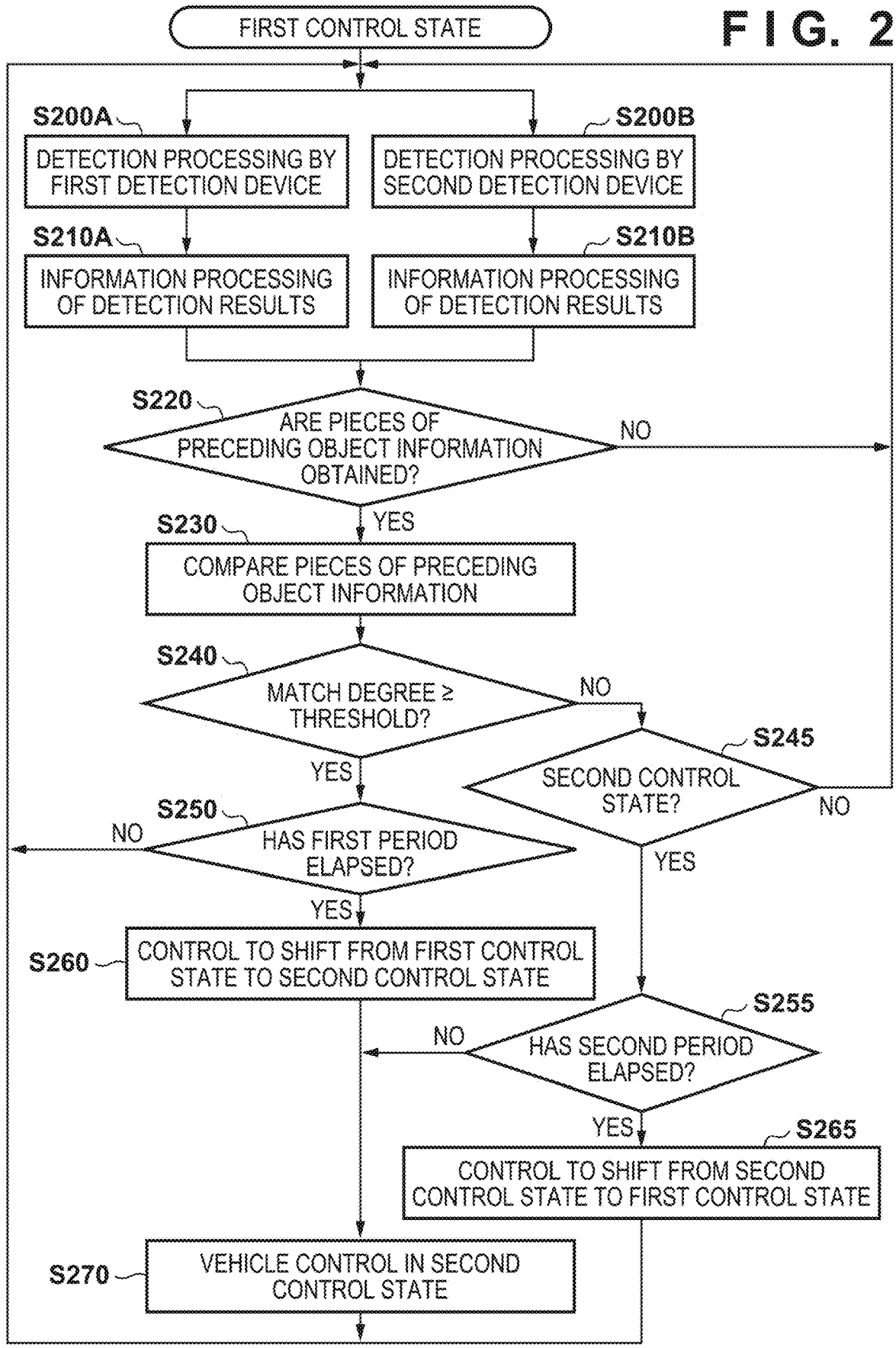
FIG. 2 is a flowchart for explaining the processing procedure of the vehicle control apparatus when a control state is to be shifted.

FIG. 2 is a flowchart that shows the procedure of processing of the vehicle control apparatus 100 when the control state is to be shifted from the first control state to the second control state. The vehicle control apparatus 100 repeatedly executes the processing shown in FIG. 2 for each predetermined sampling time. In a case in which TJP is to be performed as the second control state, the detection of the preceding vehicle 501 (immediately preceding vehicle), which is traveling ahead of the vehicle 1 (self-vehicle) on the same lane (for example, the lane L2 shown in ST51 of FIG. 5) as the travel lane of the self-vehicle, by the first detection device and the second detection device (to be described later) will be set as a condition to shift the control state.

For example, as shown in ST52 of FIG. 5, a case in which the preceding vehicle has disappeared from the lane L2 on which the vehicle 1 (self-vehicle) is traveling because a preceding vehicle 502 has made a lane change 500 to an adjacent lane L3 does not satisfy the condition to shift the control state.

In addition, as shown in ST53 of FIG. 5, cases in which a preceding vehicle 503 which is traveling in an adjacent lane L1 and a preceding vehicle 504 traveling in the adjacent lane L3 are present do not satisfy the condition to shift the control state either since these vehicles are traveling on lanes different from the travel lane L2 of the vehicle 1 (self-vehicle).

This embodiment will describe an arrangement in which the control state shift is controlled based on a detection result obtained by detecting the preceding vehicle 501 (immediately preceding vehicle) as shown in ST51 of FIG. 5 in a case in which vehicle control is executed under the first control state in a redundant detection device (the first detection device and the second detection device) arrangement.

Note that it is possible to include, as a premise of the condition to shift the control state, the fact that the vehicle 1 (self-vehicle) and the preceding vehicle are traveling at a predetermined speed or less, the fact that the type of the road on which the self-vehicle is traveling on is an expressway, or the like.

(Detection Processing and Information Processing of Detection Results by First Detection Device)

In step S200A, the first detection device performs detection processing. In this step, the first object detection units (the LiDARs 42) and the first image capturing unit (the camera 41A) which form the first detection device perform the detection processing. The pieces of information detected by the first object detection units (the LiDARs 42) and the first image capturing unit (the camera 41A) are input to the computer COM (the ECU 22 shown in FIGS. 1A and 1B).

Figure 3:
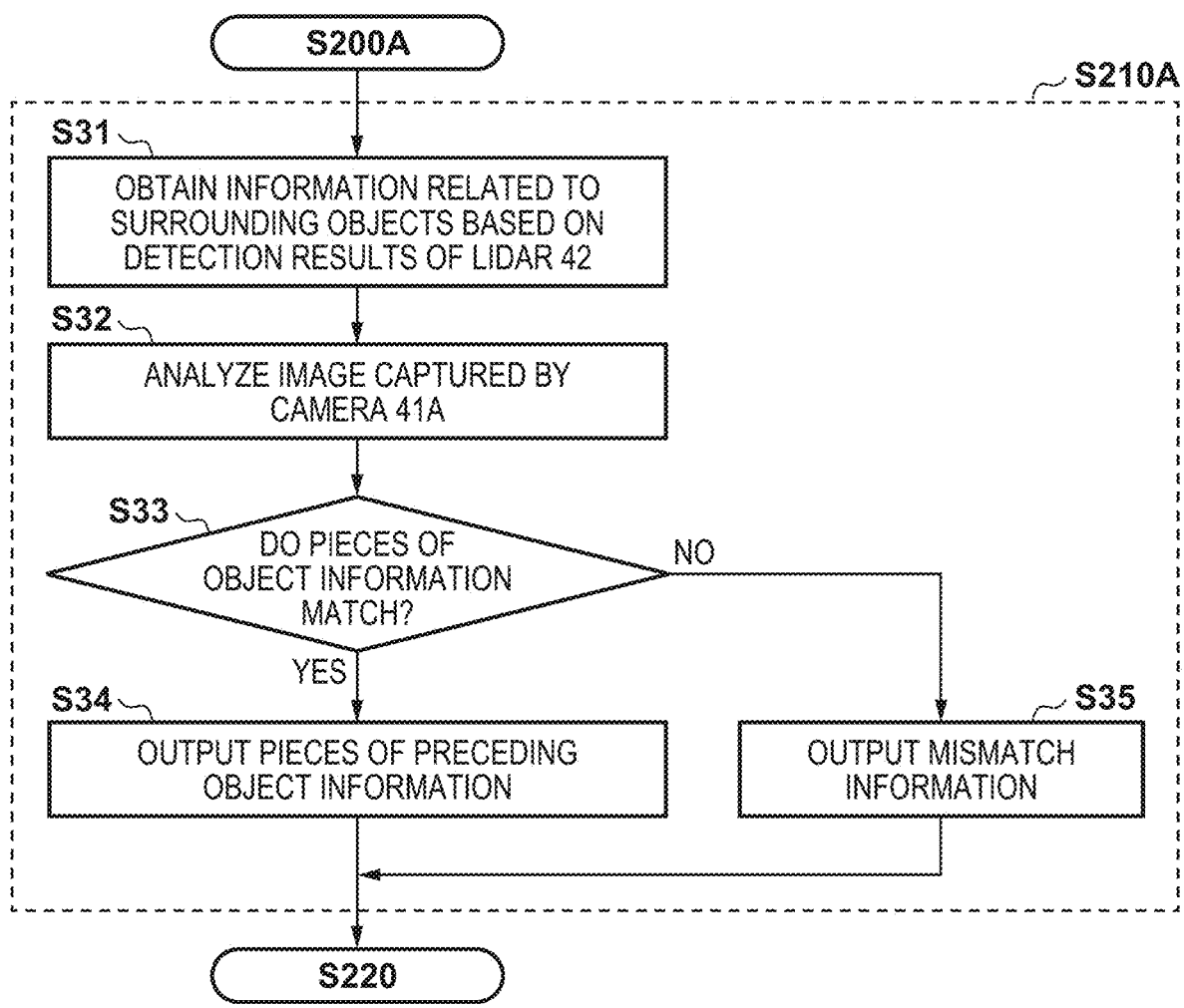
FIG. 3 is a flowchart for explaining a more specific processing procedure of step S210A.

In step S210A, the vehicle control unit C11 obtains the detection results of the first object detection units (the LiDARs 42) and the first image capturing unit (the camera 41A) and performs information processing of the detection results. FIG. 3 is a flowchart for explaining a more specific processing procedure of step S210A. First, the vehicle control unit C11 obtains, based on the detection result of the first object detection units (the LiDARs 42), information related to each object detected in the periphery of the vehicle 1 and the distance to the object (step S31).

Next, the image processing unit C12 analyzes an image (image processing) captured by the first image capturing unit (the camera 41A) to perform processing to extract, for example, the contour of the object such as the preceding vehicle traveling ahead of the self-vehicle and the travel lane boundary (for example, the guardrails, the lane markings, the roadside plantings, or the like) of the road in the travel lane of the vehicle 1 (step S32).

The vehicle control unit C11 compares the information of the object in front of the self-vehicle obtained from the first object detection units (the LiDARs 42) and the information of the object in front of the self-vehicle obtained by analyzing the image (image processing) captured by the first image capturing unit (the camera 41A) (step S33). In this case, the information of the object includes information of the type of the preceding vehicle, the information of the position of the preceding vehicle, the information concerning whether the preceding vehicle has been detected, and the like. For example, if both the first object detection units (the LiDARs 42) and the first image capturing unit (the camera 41A) detect that an object of a predetermined size is present in a predetermined distance, it can be determined that the pieces of object information match. Note that this determination is not limited to a case in which the pieces of object information completely match, and it is possible to determine that the pieces of object information are matching in a case in which the similarity between the pieces of information of the object in front of the self-vehicle obtained by the first object detection units (the LiDARs 42) and the first image capturing unit (the camera 41A) is a predetermined reference value or more. If the pieces of object information match (YES in step S33), the vehicle control unit C11 will advance the process to step S34.

In step S34, the vehicle control unit C11 obtains the pieces of object information from the first object detection units (the LiDARs 42) and the first image capturing unit (the camera 41A). That is, the vehicle control unit C11 obtains, as the information (to be also referred to as "preceding object information" or simply referred to as "object information" hereinafter) of each object in front of the vehicle 1, information (preceding vehicle information) of the preceding vehicle traveling ahead of the vehicle 1 (self-vehicle) in the same lane as the travel lane of the self-vehicle, information of the travel lane boundary (for example, the guardrails, the lane markings, the roadside plantings, or the like), and information of a lateral-side vehicle which is traveling ahead in an adjacent lane.

On the other hand, in step S33, for example, in a case in which both pieces of object information do not match (NO in step S33) such as a case in which an object of a predetermined size is not detected by the first object detection units (the LiDARs 42) even though the first image capturing unit (the camera 41A) has detected the presence of an object of a predetermined size in a predetermined distance, the vehicle control unit C11 will advance the process to step S35. Note that it is possible to also determine that a case in which the similarity between both pieces of object information is less than the predetermined reference value is a case in which the pieces of object information do not match.

Subsequently, in step S35, the vehicle control unit C11 obtains "mismatch information" which indicates that the pieces of object information mismatch. The mismatch information can be, for example, a setting value of a flag indicating that the pieces of object information mismatch.

The processing of step S210A has been described above. Note that although the processing of FIG. 3 has described processing in which information related to each object detected in the periphery of the vehicle 1 is obtained in step S31 based on the detection results of the first object detection units (the LiDARs 42) and an image captured by the camera 41A is analyzed in step S32, the procedure of the processes of steps S31 and S32 may be switched.

(Detection Processing and Information Processing of Detection Results by Second Detection Device)

The detection processing and the information processing of the detection results by the second detection device (steps S200B and S210B) will be described by referring back to FIG. 2. The detection processing and the information processing of the detection results by the second detection device are processing operations performed in parallel with the processing operations (steps S200A and S210A) of the first detection device, and the basic procedure of the processing operations is the same as the processing contents of the first detection device.

In step S200B, the second detection device performs the detection processing. In this step, the second object detection units (the radars 43) and the second image capturing unit (the camera 41B) which form the second detection device perform the detection processing. The pieces of information detected by the second object detection units (the radars 43) and the second image capturing unit (the camera 41B) are input to the computer COM (the ECU 23 shown in FIGS. 1A and 1B).

In step S210B, the vehicle control unit C11 obtains the detection results of the second object detection units (the radars 43) and the second image capturing unit (the camera 41B) and performs information processing of the detection results. FIG. 4 is a flowchart for explaining a more specific processing procedure of step S210B. First, the vehicle control unit C11 obtains, based on the detection results of the second object detection units (the radars 43), information related to each object detected in the periphery of the vehicle 1 and the distance to the object (step S41).

Next, the image processing unit C12 analyzes an image (image processing) captured by the second image capturing unit (the camera 41B) to perform processing to extract, for example, the contour of the object such as the preceding vehicle traveling ahead of the self-vehicle and the travel lane boundary (for example, the guardrails, the lane markings, the roadside plantings, or the like) of the road in the travel lane of the vehicle 1 (step S42).

The vehicle control unit C11 compares the information of the object in front of the self-vehicle obtained from the second object detection units (the radars 43) and the information of the object in front of the self-vehicle obtained by analyzing the image (image processing) captured by the second image capturing unit (the camera 41B) (step S43). In this case, the information of the object includes information of the type of the preceding vehicle, the information of the position of the preceding vehicle, the information about whether the preceding vehicle has been detected, and the like. For example, if both the second object detection units (the radars 43) and the second image capturing unit (the camera 41B) detect that an object of a predetermined size is present in a predetermined distance, it can be determined that the pieces of object information match. Note that this determination is not limited to a case in which the pieces of object information completely match, and it is possible to determine that the pieces of object information are matching in a case in which the similarity between the pieces of information of the object in front of the self-vehicle obtained by the second object detection units (the radars 43) and the second image capturing unit (the camera 41B) is a predetermined reference value or more. If the pieces of object information match (YES in step S43), the vehicle control unit C11 will advance the process to step S44.

In step S44, the vehicle control unit C11 obtains the pieces of object information from the second object detection units (the radars 43) and the second image capturing unit (the camera 41B). That is, the vehicle control unit C11 obtains, as the information (to be also referred to as "preceding object information" or simply referred to as "object information" hereinafter) of each object in front of the vehicle 1, information (preceding vehicle information) of the preceding vehicle traveling ahead of the vehicle 1 (self-vehicle) in the same lane as the travel lane of the self-vehicle, information of the travel lane boundary (for example, the guardrails, the lane markings, the roadside plantings, or the like), and information of a lateral-side vehicle which is traveling ahead in an adjacent lane.

On the other hand, in step S43, for example, in a case in which both pieces of object information do not match (NO in step S43) such as a case in which an object of a predetermined size is not detected by the second object detection units (the radars 43) even though the second image capturing unit (the camera 41B) has detected the presence of an object of a predetermined size in a predetermined distance, the vehicle control unit C11 will advance the process to step S45. Note that it is possible to also determine that a case in which the similarity between both pieces of object information is less than the predetermined reference value is a case in which the pieces of object information do not match.

Subsequently, in step S45, the vehicle control unit C11 obtains the mismatch information which indicates that the pieces of object information are mismatched. The mismatch information can be, for example, a setting value of a flag indicating that the pieces of object information are mismatched.

The processing of step S210B has been described above. Note that although the processing of FIG. 4 has described a processing in which information related to each object detected in the periphery of the vehicle 1 is obtained in step S41 based on the detection results of the second object detection units (the radars 43) and an image captured by the camera 41B is analyzed in step S42, the procedure of the processes of steps S41 and S42 may be switched.

(Determination to Obtain Preceding Object Information: Step S220)

Referring back to FIG. 2, in step S220, the vehicle control unit C11 determines whether both the first detection device and the second detection device have obtained the pieces of preceding object information. If one of the detection devices has obtained the mismatch information indicating the mismatch between the pieces of object information (NO in step S220), the vehicle control unit C11 will return the process to steps S200A and S200B, and repeat the same processing operations.

On the other hand, if it is determined in step S220 that both the first detection device and the second detection device have obtained the pieces of preceding object information (YES in step S220), the vehicle control unit C11 will advance the process to step S230.

(Determination to Compare Pieces of Preceding Object Information: Steps S230 and S240)

In step S230, the vehicle control unit C11 compares the pieces of preceding object information obtained by both the first detection device and the second detection device to obtain the similarity between the pieces of preceding object information. More specifically, the vehicle control unit C11 compares the pieces of information (the vehicle type attributes and the pieces of position information) of the object and the image processing result included in the pieces of preceding object information, and obtains a match degree (similarity degree) indicating the degree of the match (similarity) between the pieces of preceding object information.

In step S240, the vehicle control unit C11 compares the match degree of the pieces of preceding object information with a predetermined threshold. If the match degree (similarity degree) is less than the predetermined threshold (NO in step S240), the vehicle control unit C11 will advance the process to step S245.

On the other hand, if it is determined in step S240 that the match degree (similarity degree) is equal to or more than the predetermined threshold (YES in step S240), the vehicle control unit C11 will advance the process to step S250.

(Determination to Shift from First Control State to Second Control State: Steps S250 and S260)

The vehicle control unit C11 performs control to shift from the first control state to the second control state based on the condition that the match degree between the pieces of preceding object information of the vehicle 1 detected by the first detection device and the second detection device is equal to or more than the predetermined threshold.

In step S250, the vehicle control unit C11 determines whether a state in which the match degree exceeds the threshold (state in which the match degree is equal to or more than the threshold) has been continuously detected for a predetermined period (first period).

In this case, the period (first period) includes a period related to time and a period related to the distance traveled by the vehicle 1.

(Example of Period Related to Time)

In the example of the period related to time, the vehicle control unit C11 activates, in step S250, a timer C13 (a clock unit) and causes the timer to measure the time. The timer C13 measures the time of the first period which is a predetermined threshold time.

If pieces of preceding object information with a match degree which is equal to or more than the threshold have been continuously detected until the time measured by the timer C13 has become equal to or more than the first period (has passed the first period) which is the threshold time (YES in step S250), the vehicle control unit C11 will advance the process to step S260.

On the other hand, if it is determined in step S250 that the time measured by the timer has not passed the first period which is the threshold time (NO in step S250), the process returns to steps S200A and S200B, and the same processing operations are executed. If the match degree becomes less than the threshold during the period from the start of the time measurement until the end of the first period, the timer C13 will stop the time measurement and clear the measured time.

(Example of Period Related to Distance Traveled by Vehicle 1)

In the example of the period related to the distance traveled by the vehicle 1, the vehicle control unit C11 calculates the travel distance by executing integration processing on the speed information of the vehicle 1 obtained by the speed sensor S5, and compares the calculated travel distance with a predetermined threshold distance. Other than this example, the vehicle control unit C11 can also obtain, for example, the information of the travel distance from an odometer.

In the arrangement for obtaining the distance traveled by the vehicle 1, the vehicle control unit C11 and the speed sensor S5 function as a distance obtainment unit that obtains the distance traveled by the vehicle 1 in a first period which is a predetermined threshold distance.

If pieces of preceding object information with a match degree which is equal to or more than the threshold have been continuously detected until the distance obtained by the distance obtainment unit (the vehicle control unit C11 and the speed sensor S5) has become equal to or more than the first period which is the threshold distance (YES in step S250), the vehicle control unit C11 will advance the process to step S260.

On the other hand, if it is determined in step S250 that the distance obtained by the distance obtainment unit (the vehicle control unit C11 and the speed sensor S5) has not reached the first period which is the threshold distance (NO in step S250), the process returns to steps S200A and S200B, and the same processing operations are executed. If the match degree becomes less than the threshold during the period from the start of the obtainment of the distance information until the end of the first period (is reached), the distance obtainment unit (the vehicle control unit C11 and the speed sensor S5) will stop obtaining the distance information, and the distance obtained by the distance obtainment unit will be cleared.

In step S260, after the first period which is the threshold time or the threshold distance has elapsed, the vehicle control unit C11 will shift the control state from the first control state to the second control state. If the control state has already shifted to the second control state, the vehicle control unit C11 will maintain the second control state.

(Vehicle Control in Second Control State: Step S270)

Subsequently, in step S270, the vehicle control unit C11 controls the travel operation of the vehicle 1 (self-vehicle) based on vehicle control (for example, TJP) under the second control state. Subsequently, the process returns to steps S200A and S200B, and the same processing operations are repeatedly executed.

(Determination to Shift from Second Control State to First Control State: Steps S245 and S255)

If it is determined in step S240 that the match degree (similarity degree) is less than the predetermined threshold (NO in step S240), the process will advance to step S245.

In step S245, the vehicle control unit C11 determines the currently set control state. If the currently set control state is the first control state (NO in step S245), the vehicle control unit C11 will return the process to steps S200A and S200B, and the same processing operations will be executed.

On the other hand, if it is determined in step S245 that the currently set control state is the second control state (YES in step S245), the vehicle control unit C11 will advance the process to step S255.

In step S255, the vehicle control unit C11 determines whether a state in which the match degree has not exceeded the threshold (a state in which the match degree is less than the threshold) has been continuously detected for a predetermined period (second period).

In this case, the period (second period) includes, in the same manner as the period (first period), a period related to time and a period related to a distance traveled by the vehicle 1.

(Example of Period Related to Time)

In the example of the period related to time, the timer C13 measures the time of the second period which is a predetermined threshold time.

If pieces of preceding object information with a match degree less than the threshold have been continuously detected until the time measured by the timer C13 has become equal to or more than the second period (has passed the second period) which is the threshold time (YES in step S255), the vehicle control unit C11 will advance the process to step S265. In step S265, after the elapse of the second period which is the threshold time, the vehicle control unit C11 shifts the control state from the second control state to the first control state. Subsequently, the process returns to steps S200A and S200B, and the same processing operations are repeatedly executed.

On the other hand, if it is determined that the time measured by the timer C13 has not passed the second period which is the threshold time (NO in step S255), the vehicle control unit C11 will advance the process to step S270. In step S270, the vehicle control unit C11 will maintain performing vehicle control based on the second control state. Subsequently, the process returns to steps S200A and S200B, and the same processing operations are repeatedly executed.

(Example of Period Related to Distance)

In the same manner, in the example of the distance related to the distance, the distance obtainment unit (the vehicle control unit C11 and the speed sensor S5) obtains the distance traveled by the vehicle 1 in the second period which is a predetermined threshold distance.

If the pieces of preceding object information with a match degree which is less than the threshold have been continuously detected until the distance obtained by the distance obtainment unit (the vehicle control unit C11 and the speed sensor S5) has become equal to or more than the second period which is the threshold distance (YES in step S255), the vehicle control unit C11 will advance the process to step S265. In step S265, after the elapse of the second period which is the threshold distance, the vehicle control unit C11 shifts the control state from the second control state to the first control state. Subsequently, the process returns to steps S200A and S200B, and the same processing operations are repeatedly executed.

On the other hand, if it is determined in step S255 that the distance obtained by the distance obtainment unit (the vehicle control unit C11 and the speed sensor S5) has not reached the second period which is the threshold distance (NO in step S255), the vehicle control unit C11 will advance the process to step S270. In step S270, the vehicle control unit C11 will maintain performing vehicle control based on the second control state. Subsequently, the process returns to steps S200A and S200B, and the same processing operations are repeatedly executed.

In this case, the first period, which is the threshold time or the threshold distance related to shift control from the first control state to the second control state, is set to be longer than the second period which is the threshold time or the threshold distance related to shift control from the second control state to the first control state. Setting the first period to be longer than the second period will allow the control state shift to be performed under a more stable detection state when the control state is to shift to a more advanced control state.

In addition, the vehicle control unit C11 can perform display control to cause the display device 92 (FIG. 1B) to display a user interface for setting the first period and the second period. As a result, the shift control of the control state will be able to reflect the driver's setting (preference).

[Processing Modification 1]

The processing of step S240 of FIG. 2 described above described that the vehicle control unit C11 will advance the process to step S245 if the match degree (similarity degree) is less than the predetermined threshold (NO in step S240) when the vehicle control unit C11 has compared the match degree between the pieces of the preceding object information with the predetermined threshold.

In the modification of this processing, in a case in which a difference between a predetermined threshold and the match degree of vehicle information is equal to or more than a predetermined difference value, the vehicle control unit C11 can perform control to shift the control state of the vehicle 1 from the second control state to the third control state. In this case, that is, in a case in which "NO" is determined in step S240, the vehicle control unit C11 will determine whether the following relationship is satisfied.

(predetermined threshold related to match degree)−
(match degree between pieces of preceding
object information)≥predetermined difference
value A case in which the above relationship is satisfied is a state in which the match degree between the pieces of the preceding object information is lower than the predetermined threshold by a predetermined difference value or more. If this relationship is satisfied, the vehicle control unit C11 will perform control to shift the control state to the third control state without performing the processes of steps S245 and S255 of FIG. 2 (without waiting for the second period to elapse).

As a result, in the case of an unstable detection state in which the match degree between the pieces of preceding object information becomes lower than the predetermined threshold by a predetermined difference value or more, it becomes possible to quickly avoid the execution of vehicle control based on a more advanced control state by shifting the control state from the second control state to the third control state without waiting for the second period to elapse.

On the other hand, if (predetermined threshold related to match degree)−(match degree between pieces of preceding object information)<predetermined difference value, the vehicle control unit C11 will execute the processes of steps S245 and S255 as described in FIG. 2.

[Processing Modification 2]

The above embodiment and processing modification 1 described an arrangement in which control to shift the control state is performed based on comparison processing using pieces of preceding object information (which includes the preceding vehicle information, the information of the travel lane boundary of the road, and the information of a lateral-side vehicle traveling ahead in an adjacent lane). However, other than this example, the vehicle control unit C11 can perform control to shift the control state based on comparison processing using information (preceding vehicle information) of the preceding vehicle traveling ahead on the same lane as the travel lane of the vehicle 1 (self-vehicle).

In addition, the vehicle control unit C11 can perform control to shift the control state based on comparison information using the preceding vehicle information and the information of the travel lane boundary of the road. Alternatively, the vehicle control unit C11 can perform control to shift the control state based on comparison processing using the preceding vehicle information and the information of a lateral-side vehicle traveling ahead in an adjacent lane.

Other Embodiments

In addition, a vehicle control program configured to implement at least one function of the embodiment is supplied to a system or an apparatus via a network or a storage medium, and at least one processor in the computer of the system or the apparatus can read out and execute the program. It is also possible to implement the present invention by such a mode.

SUMMARY OF EMBODIMENTS

Arrangement 1. There is provided a vehicle control apparatus according to the above-described embodiment which is a vehicle control apparatus (for example, 100 of FIG. 1A) that can control a vehicle based on a plurality of control states, comprising:

first detection means (for example, the LiDARs 42, the camera 41A) that has a first detection range;

second detection means (for example, the radars 43, the camera 41B) that has a second detection range which at least partially overlaps the first detection range; and vehicle control means (for example, the vehicle control unit C11 of FIG. 1A) for performing, as vehicle control based on a plurality of control states, vehicle control based on a first control state and vehicle control based on a second control state which has a high vehicle control automation rate or a reduced degree of vehicle operation participation requested to a driver compared to the first control state, wherein the vehicle control means (C11) performs control to shift from the first control state to the second control state based on a condition that a match degree between pieces of preceding object information of the vehicle detected by the first detection means (42, 41A) and the second detection means (43, 41B) is not less than a threshold.

According to the vehicle control apparatus of arrangement 1, the control state can be shifted in a stable detection state. For example, in a case in which the control state is to be shifted to a more advanced control state, that is, a control state with a higher vehicle control automation rate or a lower degree of vehicle operation participation requested to the driver than the current control state, the control state can be shifted in a stable detection state by setting, as a condition, the fact that the match between the redundantly detected pieces of preceding object information is equal to or more than a predetermined threshold. As a result, it is possible to perform, for a longer period, vehicle control based on a control state with a high vehicle control automation rate or a reduced degree of vehicle operation participation requested to the driver.

Arrangement 2. There is provided the vehicle control apparatus (100) according to the above-described embodiment, wherein in a case in which the first detection means and the second detection means have detected, for a predetermined first period, the pieces of preceding object information that have the match degree which is not less than the threshold, the vehicle control means (C11) performs vehicle control by shifting the control state from the first control state to the second control state.

According to the vehicle control apparatus of arrangement 2, the control state can be shifted in a stable detection state.

Arrangement 3. There is provided the vehicle control apparatus (100) according to the above-described embodiment, wherein the first detection means (42, 41A) includes a first object detection unit (42) configured to use light to detect an object in the periphery of the vehicle and a first image capturing unit (41A) configured to obtain an image of the front of the vehicle, and the second detection means (43, 41B) includes a second object detection unit (43) configured to use radio waves to detect the object in the periphery of the vehicle and a second image capturing unit (41B) configured to obtain an image of the front of the vehicle, and the first image capturing unit (41A) and the second image capturing unit (41B) of the first detection means (42, 41A) and the second detection means (43, 41B), respectively, are of the same type.

According to the vehicle control apparatus of arrangement 3, by setting a redundant arrangement in which the first detection unit and the second detection unit include the same type of image capturing units as each other, the control state can be shifted based on a detection result with higher reliability.

Arrangement 4. There is provided the vehicle control apparatus (100) according to the above-described embodiment, wherein in the second control state, based on a condition that the match degree of the pieces of preceding object information of the vehicle detected by the first detection means (42, 41A) and the second detection means (43, 41B) is less than the predetermined threshold, the vehicle control means (C11) performs control to shift from the second control state to the first control state.

Arrangement 5. There is provided the vehicle control apparatus (100) according to the above-described embodiment, wherein in the second control state, based on a condition that the match degree of the pieces of preceding object information becomes less than a predetermined threshold as a result of comparing the pieces of preceding object information of the vehicle obtained from the first object detection unit (42) and the first image capturing unit (41A) or based on a condition that the match degree of the pieces of preceding object information becomes less than the predetermined threshold as a result of comparing the pieces of preceding object information of the vehicle obtained from the second object detection unit (43) and the second image capturing unit (41B), the vehicle control means (C11) performs control to shift from the second control state to the first control state.

Arrangement 6. There is provided the vehicle control apparatus (100) according to the above-described embodiment, wherein in the second control state, in a case in which the first detection means (42, 41A) and the second detection means (43, 41B) have detected, for a predetermined second period, the pieces of preceding object information that have the match degree which is less than the threshold, the vehicle control means (C11) performs vehicle control by shifting the control state from the second control state to the first control state.

Arrangement 7. There is provided the vehicle control apparatus (100) according to the above-described embodiment, wherein the preceding object information includes at least one of information of the type of a preceding vehicle, information of the position of the preceding vehicle, and information concerning whether the preceding vehicle has been detected.

According to the vehicle control apparatus of arrangements 4 to 7, by shifting the control state from the second control state, which is a more advanced control state than the first control state, to the first control state in a case in which the detection state is unstable, vehicle control based on a more advanced control state can be avoided in a case in which the detection state is unstable.

Arrangement 8. There is provided the vehicle control apparatus (100) according to the above-described embodiment, further comprising:

time measurement means (for example, the timer C13 of FIG. 1A) for measuring time of a first period which is a predetermined threshold time, wherein in a case in which the pieces of preceding object information that have the match degree which is not less than the threshold have been continuously detected until the time measured by the time measurement means (C13) is not less than the first period which is the threshold time, the vehicle control means (C11) shifts the control state from the first control state to the second control state after the first period which is the threshold time has elapsed.

Arrangement 9. There is provided the vehicle control apparatus (100) according to the above-described embodiment, further comprising:

distance obtainment means (for example, the vehicle control unit C11, the speed sensor S5) for obtaining a distance traveled by the vehicle in a first period which is a predetermined threshold distance, wherein in a case in which the pieces of preceding object information that have the match degree which is not less than the threshold have been continuously detected until the distance obtained by the distance obtainment means (C11, S5) is not less than the first period which is the threshold distance, the vehicle control means (C11) shifts the control state from the first control state to the second control state after the first period which is the threshold distance has been traveled.

According to the vehicle control apparatus of arrangements 8 and 9, the control state can be shifted in a stable detection state.

Arrangement 10. There is provided the vehicle control apparatus (100) according to the above-described embodiment, further comprising:

time measurement means (for example, the timer C13 of FIG. 1A) for measuring time of the second period which is a predetermined threshold time, wherein in a case in which the pieces of preceding object information that have the match degree which is less than the threshold have been continuously detected until the time measured by the time measurement means (C13) is not less than the second period which is the threshold time, the vehicle control means (C11) shifts the control state from the second control state to the first control state after the second period which is the threshold time has elapsed.

Arrangement 11. There is provided the vehicle control apparatus (100) according to the above-described embodiment, further comprising:

distance obtainment means (for example, the vehicle control unit C11, the speed sensor S5) for obtaining a distance traveled by the vehicle in the second period which is a predetermined threshold distance, wherein in a case in which the pieces of preceding object information that have the match degree which is less than the threshold have been continuously detected until the distance obtained by the distance obtainment means (C11, S5) is not less than the second period which is the threshold distance, the vehicle control means (C11) shifts the control state from the second control state to the first control state after the second period which is the threshold distance has been traveled.

According to the vehicle control apparatus of arrangements 10 and 11, by shifting the control state from the second control state, which is a more advanced control state than the first control state, to the first control state in a case in which the detection state is unstable, vehicle control based on the more advanced control state can be avoided in a case in which the detection state is unstable.

Arrangement 12. There is provided the vehicle control apparatus (100) according to the above-described embodiment, wherein the first period is set to be longer than the second period.

According to the vehicle control apparatus of arrangement 12, setting the first period to be longer than the second period will allow the control state to shift under a more stable detection state when the control state is to shift to a more advanced control state.

Arrangement 13. There is provided the vehicle control apparatus (100) according to the above-described embodiment, wherein the vehicle control means performs display control to cause display means (for example, 92 of FIG. 1B) to display a user interface for setting the first period and the second period.

According to the vehicle control apparatus of arrangement 13, the driver's setting can be reflected, via a user interface of the display means, to the control to shift the control state.

Arrangement 14. There is provided a vehicle (for example, the vehicle 1 of FIG. 1B) according to the above-described embodiment which is a vehicle that can travel based on control by a vehicle control apparatus, comprising:

the vehicle control apparatus (for example, the vehicle control apparatus 100 of FIG. 1A) defined in any one of arrangements 1 to 13.

According to the vehicle of arrangement 14, a vehicle that can shift the control state in a stable detection state can be provided. For example, in a case in which the control state is to be shifted to a more advanced control state, that is, a control state with a higher vehicle control automation rate or a lower degree of vehicle operation participation requested to the driver than the current control state, the control state can be shifted in a stable detection state by setting, as a condition, the fact that the match between the redundantly detected pieces of preceding object information is equal to or more than a predetermined threshold. As a result, it is possible to provide a vehicle that can perform, for a longer period, vehicle control based on a control state with a high vehicle control automation rate or a reduced degree of vehicle operation participation requested to the driver.

Arrangement 15. There is provided a vehicle control method of a vehicle control apparatus (100) according to the above-described embodiment which is a vehicle control method of a vehicle control apparatus (for example, 100 of FIG. 1A) that can control a vehicle based on a plurality of control states, including a first detection means (for example, the LiDARs 42, the camera 41A) that has a first detection range, and a second detection means (for example, the radars 43, the camera 41B) that has a second detection range which at least partially overlaps the first detection range, the method comprising:

a vehicle control step of performing, as vehicle control based on a plurality of control states, vehicle control based on a first control state and vehicle control based on a second control state which has a high vehicle control automation rate or a reduced degree of vehicle operation participation requested to a driver compared to the first control state, wherein in the vehicle control step, control is performed to shift from the first control state to the second control state based on a condition that a match degree between pieces of preceding object information of the vehicle detected by the first detection unit and the second detection unit is not less than a threshold.

According to the vehicle control method of the vehicle control apparatus of arrangement 15, the control state can be shifted in a stable detection state. For example, in a case in which the control state is to shift to a more advanced control state, that is, a control state with a higher vehicle control automation rate or a lower degree of vehicle operation participation requested to the driver than the current control state, the control state can be shifted in a stable detection state by setting, as a condition, the fact that the degree of match between the redundantly detected pieces of preceding object information is equal to or more than a predetermined threshold. As a result, it is possible to perform, for a longer period, vehicle control based on a control state with a high vehicle control automation rate or a reduced degree of vehicle operation participation requested to the driver.

Arrangement 16. There is provided a program according to the above-described embodiment that causes a computer (for example, the CPU of FIG. 1A) to execute each step of a vehicle control method defined in arrangement 15.

According to the program of arrangement 16, a vehicle control program that can shift the control state in a stable detection state can be provided. For example, in a case in which the control state is to be shifted to a more advanced control state, that is, a control state with a higher vehicle control automation rate or a lower degree of vehicle operation participation requested to the driver than the current control state, it is possible to provide a vehicle control program that can shift the control state in a stable detection state by setting, as a condition, the fact that the match between the redundantly detected pieces of preceding object information is equal to or more than a predetermined threshold. As a result, it is possible to perform, for a longer period, vehicle control based on a control state with a high vehicle control automation rate or a reduced degree of vehicle operation participation requested to the driver.

The invention is not limited to the foregoing embodiments, and various variations/changes are possible within the spirit of the invention.

What is claimed is:

1. A vehicle control apparatus that can control a vehicle based on a plurality of control states, comprising:
   a first detector having a first detection range;
   a second detector having a second detection range which at least partially overlaps the first detection range; and
   at least one processor circuit with a memory comprising instructions, that when executed by the at least one processor circuit, cause the at least one processor circuit to at least perform, as vehicle control based on a plurality of control states, vehicle control based on a first control state and vehicle control based on a second control state which has a high vehicle control automation rate or a reduced degree of vehicle operation participation requested to a driver compared to the first control state, wherein the instructions, when executed by the at least one processor circuit, further cause the at least one processor circuit to at least:

perform vehicle control to shift from the first control state to the second control state based on a condition that a match degree between pieces of preceding object information of the vehicle detected by the first detector and the second detector is not less than a threshold, and in a case in which the first detector and the second detector have detected, for a first period, the pieces of preceding object information that have the match degree which is not less than the threshold, perform vehicle control by shifting the control state from the first control state to the second control state.

2. The apparatus according to claim 1, wherein the first detector includes a first object detection sensor that uses light to detect an object in a periphery of the vehicle and a first image capturing apparatus that obtains an image of a front of the vehicle, and the second detector includes a second object detection sensor that uses radio waves to detect the object in the periphery of the vehicle and a second image capturing apparatus that obtains an image of the front of the vehicle, and the first image capturing apparatus and the second image capturing apparatus of the first detector and the second detector, respectively, are of a same type.

3. The apparatus according to claim 1, wherein in the second control state, based on a condition that the match degree of the pieces of preceding object information of the vehicle detected by the first detector and the second detector is less than the threshold, the instructions, when executed by the at least one processor circuit, further cause the at least one processor circuit to at least perform control to shift from the second control state to the first control state.

4. The apparatus according to claim 2, wherein in the second control state, based on a condition that the match degree of the pieces of preceding object information becomes less than the threshold as a result of comparing the pieces of preceding object information of the vehicle obtained from the first object detection sensor and the first image capturing apparatus or based on a condition that the match degree of the pieces of preceding object information becomes less than the threshold as a result of comparing the pieces of preceding object information of the vehicle obtained from the second object detection sensor and the second image capturing apparatus, the instructions, when executed by the at least one processor circuit, further cause the at least one processor circuit to at least perform vehicle control to shift from the second control state to the first control state.

5. The apparatus according to claim 1, wherein in the second control state, in a case in which the first detector and the second detector have detected, for a second period, the pieces of preceding object information that have the match degree which is less than the threshold, the instructions, when executed by the at least one processor circuit, further cause the at least one processor circuit to at least perform vehicle control by shifting the control state from the second control state to the first control state.

6. The apparatus according to claim 1, wherein the preceding object information includes at least one of information of a type of a preceding vehicle, information of a position of the preceding vehicle, and information concerning whether the preceding vehicle has been detected.

7. The apparatus according to claim 1, wherein the instructions, when executed by the at least one processor circuit, further cause the at least one processor circuit to at least:

measure a time of the first period which is a threshold time, wherein in a case in which the pieces of preceding object information that have the match degree which is not less than the threshold have been continuously detected until the time measured by the at least one processor circuit is not less than the first period which is the threshold time, and the instructions, when executed by the at least one processor circuit, further cause the at least one processor circuit to at least shift the control state from the first control state to the second control state after the first period which is the threshold time has elapsed.

8. The apparatus according to claim 1, wherein the instructions, when executed by the at least one processor circuit, further cause the at least one processor circuit to at least:

obtain a distance traveled by the vehicle in the first period which is a threshold distance, and in a case in which the pieces of preceding object information that have the match degree which is not less than the threshold have been continuously detected until the distance obtained by the at least one processor circuit is not less than the first period which is the threshold distance, shift the control state from the first control state to the second control state after the first period which is the threshold distance has been traveled.

9. The apparatus according to claim 5, wherein the instructions, when executed by the at least one processor circuit, further cause the at least one processor circuit to at least:

measure a time of the second period which is a threshold time, and in a case in which the pieces of preceding object information that have the match degree which is less than the threshold have been continuously detected until the time measured by the at least one processor circuit is not less than the second period which is the threshold time, shift the control state from the second control state to the first control state after the second period which is the threshold time has elapsed.

10. The apparatus according to claim 5, wherein the instructions, when executed by the at least one processor circuit, further cause the at least one processor circuit to at least:

obtain a distance traveled by the vehicle in the second period which is a threshold distance, and in a case in which the pieces of preceding object information that have the match degree which is less than the threshold have been continuously detected until the distance obtained by the at least one processor circuit is not less than the second period which is the threshold distance, shift the control state from the second control state to the first control state after the second period which is the threshold distance has been traveled.

11. The apparatus according to claim 5, wherein the first period is set to be longer than the second period.

12. The apparatus according to claim 11, wherein the instructions, when executed by the at least one processor circuit, further cause the at least one processor circuit to at least perform display control to cause a display to display a user interface for setting the first period and the second period.

13. A vehicle that can travel based on control by a vehicle control apparatus, comprising:

the vehicle control apparatus defined in claim 1.

14. A vehicle control method of a vehicle control apparatus that can control a vehicle based on a plurality of control states, including a first detector that has a first detection range, and a second detector that has a second detection range which at least partially overlaps the first detection range, the method comprising:

performing, as vehicle control based on a plurality of control states, vehicle control based on a first control state and vehicle control based on a second control state which has a high vehicle control automation rate or a reduced degree of vehicle operation participation requested to a driver compared to the first control state, wherein in the performing, vehicle control is performed to shift from the first control state to the second control state based on a condition that a match degree between pieces of preceding object information of the vehicle detected by the first detector and the second detector is not less than a threshold, and in a case in which the first detector and the second detector have detected, for a first period, the pieces of preceding object information that have the match degree which is not less than the threshold, and in the performing, vehicle control is performed by shifting the control state from the first control state to the second control state.

15. A non-transitory computer-readable storage medium storing a program that causes a computer to execute each step of a vehicle control method defined in claim 14.

* * * * *